(12) United States Patent
Shimada et al.

(10) Patent No.: US 7,263,897 B2
(45) Date of Patent: Sep. 4, 2007

(54) THREE-AXIS MOTION TABLE

(75) Inventors: Yuzo Shimada, Tokyo (JP); Kenji Uchiyama, Tokyo (JP)

(73) Assignee: Nihon University, Tokyo (JP)

( * ) Notice: Subject to any disclaimer, the term of this patent is extended or adjusted under 35 U.S.C. 154(b) by 101 days.

(21) Appl. No.: 10/556,774

(22) PCT Filed: May 6, 2004

(86) PCT No.: PCT/JP2004/006430
§ 371 (c)(1),
(2), (4) Date: Nov. 15, 2005

(87) PCT Pub. No.: WO2004/102581
PCT Pub. Date: Nov. 25, 2004

(65) Prior Publication Data
US 2006/0293795 A1  Dec. 28, 2006

(30) Foreign Application Priority Data
May 15, 2003 (JP) .............................. 2003-137056

(51) Int. Cl.
*G01M 5/00* (2006.01)
(52) U.S. Cl. ....................................................... 73/802
(58) Field of Classification Search ................... 73/802
See application file for complete search history.

(56) References Cited

U.S. PATENT DOCUMENTS

| 5,060,932 A | 10/1991 | Yamaguchi |
| 5,509,631 A * | 4/1996 | De Salvo ..................... 248/370 |

FOREIGN PATENT DOCUMENTS

| JP | 3-4890 | 1/1991 |
| JP | 4-318889 | 11/1992 |
| JP | 2000-79900 | 3/2000 |

\* cited by examiner

*Primary Examiner*—Michael Cygan
*Assistant Examiner*—O. Davis
(74) *Attorney, Agent, or Firm*—Kratz, Quintos & Hanson, LLP

(57) ABSTRACT

The present invention aims at providing a three-axis motion table capable of ensuring smooth rotations around three rotation axes orthogonal to each other and decreasing an overall weight.

The three-axis motion table according to the present invention has an outside frame (3), an (e.g., approximately square) intermediate frame (5), and an (e.g., approximately square) inside frame (7). The outside frame (3) is rotatably mounted around a first rotation axis (2) by means of a pair of both-end supporting legs (1, 1). The intermediate frame (5) is rotatably mounted around a second rotation axis (4) by means of the outside frame (3). The inside frame (7) is rotatably mounted around a third rotation axis (6) by means of the intermediate frame (5). The inside frame (7) has a holding mechanism for a tested model (J). One of the both-end supporting legs (1, 1) is provided with a first motor (M1) to rotate the outside frame (3). The outside frame (3) is provided with a second motor (M2) to rotate the intermediate frame (5). The intermediate frame (5) is provided with a third motor (M3) to rotate the inside frame (7).

According to the above-mentioned configuration, the first through third motors (M1 through M3)rotate. The inside frame (7) holding the tested model (J) rotates in the space inside the intermediate frame (5). The intermediate frame (5) rotates in the space inside the outside frame (3). In this maimer, rotations are provided around the three rotation axes (2, 4, 6) orthogonal to each other. The pair of both-end supporting legs (1, 1) works as a base for supporting the entire three-axis motion table (A). The pair of both-end supporting legs (1, 1) is more stable than a base (B in FIG. 10) according to the conventional technology using only one vertical rotation axis for supporting one end. The pair of both-end supporting legs (1, 1) is capable of miniaturization and weight saving.

1 Claim, 7 Drawing Sheets

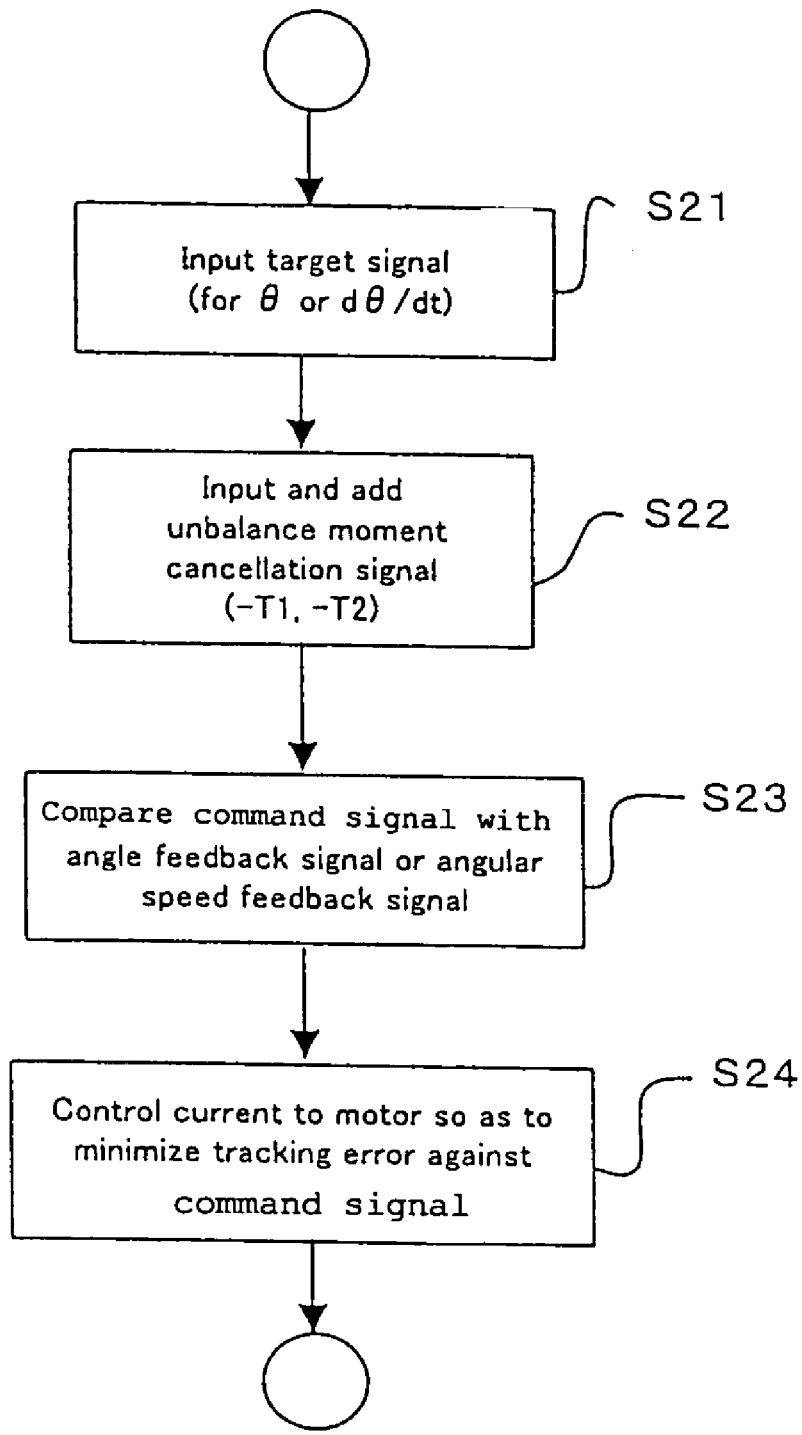

THREE-AXIS MOTION TABLE

TECHNICAL FIELD

The present invention relates to a three-axis motion table and its rotation control in terms of an attitude control device/setup for simulating and testing rotational motions of aircraft, rockets, artificial satellites, and various vehicles (hereafter referred to as a "tested model").

BACKGROUND ART

Many conventional three-axis motion tables are configured so that one rotation axis P vertically supports the whole of a three-axis motion table J as shown in FIG. 10.

According to the example in FIG. 10, the single rotation axis supports the whole of the three-axis motion table J. The mechanism of a base portion B for supporting the rotation axis P (a vertically extending rotation axis) becomes large and increases the weight so as to enable the reliable support in all directions.

For example, let us consider a case of mounting an experimentally produced artificial satellite on the three-axis motion table and testing attitude control motions in the three-dimensional space. There has been a demand for possible weight saving so as to be able to simulate accurate high-speed rotational motions. The conventional three-axis motion table is contrary to such demand.

The conventional three-axis motion table is made of a casting to prevent a frame's elastic vibration as disturbance to tested models. Accordingly, the three-axis motion table is inevitably subject to a large inertia moment and needs to be driven by a hydraulic motor that provides a large torque.

In addition, the three-axis motion table must be manufactured to further improve the rigidity so that a frame's vibration frequency can be separated from an operation (attitude motion) frequency domain for an artificial satellite as a tested model. This also has been a cause of increasing the inertia moment and the weight.

Furthermore, a hydraulic motor is inappropriate for endless/limitless rotations in the same direction and involves a narrow range of adjusting rotational speeds.

Conventionally, as mentioned above, castings have been used to cause an elastic vibration at high frequencies by using highly rigid members made of castings. This makes it possible to satisfactorily distinguish between frequency domains for the operational bandwidth and the vibration domain of a manufactured three-axis motion table.

It is necessary to determine whether or not the manufactured three-axis motion table causes adjacent or overlapping frequency domains for the operational bandwidth and the elastic vibration. This determination is not performed before manufacture of actual products and has been based on a designer's so-called "intuition." For this reason, there has been a tendency toward the safe design, i.e., using highly rigid materials to prevent vibrations. Such tendency (toward the design of using highly rigid materials) also causes the inertia moment and the weight to increase and results in heavy usage of hydraulic motors capable of a large torque.

By contrast, there is a consideration for using an electric motor having less torque than the hydraulic motor to improve the three-axis motion table's operation bandwidth. For this purpose, the inertia moment and the weight need to be suppressed. When it is supposed to configure the frame with lightweight but less rigid materials such as aluminum, the manufactured three-axis motion table causes adjacent or overlapping frequency domains for the operational bandwidth and the vibration. It is impossible to eliminate an elastic vibration signal from signals detected by a sensor mounted on the tested model using a lowpass filter and the other means.

There have been available various types of the three-axis motion table J as shown in FIG. 10 (e.g., see the three-axis attitude control system testing facility issued by National Space Development Agency of Japan (NASDA) on June, 2001). None of the proposals solves the above-mentioned problems.

The present invention has been made in consideration of the foregoing. It is therefore an object of the present invention to provide a three-axis motion table that possibly decreases inertia moments around three orthogonal axes to enable the use of an electric motor generating less output (than a hydraulic motor) and increases tracking characteristics against target signals for angles and angular speed up to a high frequency domain to enable any attitude control testing in the three-dimensional space.

DISCLOSURE OF THE INVENTION

A three-axis motion table (A) according to the present invention is composed of: an (approximately square, for example) outside frame (3) rotatably mounted around a first rotation axis by means of a pair of both-end supporting legs (1, 1); an (approximately square, for example) intermediate frame (5) rotatably mounted around a second rotation axis (4) by means of the outside frame (3); and an (approximately square, for example) inside frame (7) rotatably mounted around a third rotation axis (6) by means of the intermediate frame (5). The inside frame (7) holds a tested model (J). One of the supporting legs (1, 1) is provided with a first motor (M1) to rotate the outside frame (3). The outside frame (3) is provided with a second motor (M2) to rotate the intermediate frame (5). The intermediate frame (5) is provided with a third motor (M3) to rotate the inside frame (7).

The outside frame (3), the intermediate frame (5), and the inside frame (7) are similar to each other. The inside of the intermediate frame (5) is formed of a space large enough for the inside frame (7) to be rotatable. The inside of the outside frame (3) is formed of a space large enough for the intermediate frame (5) to be rotatable.

The first through third motors (M1 through M3) rotate in the three-axis motion table (A) having the above-mentioned configuration. The inside frame (7) holding the tested model (J) rotates in the space inside the intermediate frame (5). The intermediate frame (5) rotates in the space inside the outside frame (3). In this manner, rotations are provided around the three rotation axes (2, 4, 6) orthogonal to each other.

The pair of both-end supporting legs (1, 1) works as a base for supporting the entire three-axis motion table (A). The pair of both-end supporting legs (1, 1) is more stable than a base (B in FIG. 10) according to the conventional technology using only one vertical rotation axis for supporting one end. The pair of both-end supporting legs (1, 1) is capable of miniaturization and weight saving.

The pair of both-end supporting legs (1, 1), the outside frame (3), the intermediate frame (5), and the inside frame (7) may be made of metal materials with high specific strength such as titanium alloy, aluminum alloy, magnesium alloy, high-tension steel, and the like. It is desirable to use aluminum alloy (e.g., A5052P) from the viewpoint of prices and ease of processing.

It is preferable to form punched portions (punch holes for saving weights and decreasing inertia moments) on the outside frame (3), the intermediate frame (5), and the inside frame (7).

This configuration makes it possible to provide further weight saving by maintaining the rigidity.

Since the entire three-axis motion table (A) can be light-weighted, it is possible to use the electric motors (M1 through M3) for all the three axes instead of a hydraulic motor.

Of three axes, it is possible to rotate only the third axis using an electric motor and rotate the remaining two axes using hydraulic motors. Alternatively, it is possible to rotate the third axis using an electric motor and rotate the remaining two axes using hydraulic motors.

It is necessary to balance weights of the second motor (M2) and the third motor (M3) against rotation axes. For this purpose, it is preferable to provide the outside frame (3) and the intermediate frame (5) with counter weights (CW2 and CW3) at positions to balance the motor weights.

However, it is also possible to compensate the gravity under automatic control without using counter weights.

Counter weights are detachable from the outside frame (3) and the intermediate frame (5). Inertia moments can be decreased to obtain higher operational bandwidths. To cancel a moment due to unbalance that occurred at this time, an external computer may be used to generate a moment to cancel that moment using rotation angle signals detected by a detector for the axes. It is preferable to transmit a generated motor control signal to the first to third motors (M1 through M3) via a console (E). When a tested model is configured to be axisymmetric, there is no need to generate the above-mentioned cancellation moment for the third motor (M3).

According to the present invention, the following configuration is preferable. There are provided a rotation angle sensor from each of three motor axes and an angular speed detection circuit. An angular speed signal is compared with a target angle signal and a target angular speed signal to generate a control current for minimizing a difference between the target angle and the target angular speed. The first through third motors are controlled to achieve a target rotation angle and a target rotational speed.

When this configuration is used to measure rotation angles for the three axes at a specified control interval, an external computer can easily calculate moments caused by the unbalance. It is possible to control unbalanced moments resulting from weights of the motors (M2 and M3).

Since no motor is used for the inside frame to hold tested models, the third motor originally does not require generation of cancellation moments. When a tested model is not axisymmetric, however, the same principle can be applied to cancel unbalanced weights.

The present invention calculates a moment due to unbalance (resulting from weights of the second and third motors M2 and M3) caused by elimination of the counter weights (CW2 and CW3) at a specified control interval. To cancel effects of such moment, it is preferable to provide a controller to give control to add a cancellation signal to a target signal for the rotation angle or the angular speed of the first and second motors (M1 and M2).

More specifically, a three-axis motion table according to the present invention is preferably configured to include first control means (control table E) and second control means (external computer G), wherein the first control means (console E) includes: an input portion (10) capable of selectively inputting any one of an angle and an angular speed as a target signal (target angle or target angular speed).

Further, a three-axis motion table according to the present invention is preferably configured as follows. There is provided a rotation angle sensor from each of three motor axes. A signal from the rotation angle sensor is electrically processed to obtain an angular speed signal. The angular speed signal is compared with a target angle signal and a target angular speed signal to generate a control signal for minimizing a difference between the target angle and the target angular speed and controlling the first through third motors and to achieve a target rotation angle and a target rotational speed. A minimum frequency for a vibration domain becomes greater than or equal to a specified value with reference to a maximum frequency for an operational bandwidth.

More specifically, the three-axis motion table according to comprises:

first control means (console E) and second control means (external computer G);

wherein the first control means (console E) includes: an input portion (10) capable of selectively inputting any one of an angle and an angular speed as a target signal (target angle or target angular speed); an angular speed detection circuit (22) to find an angular speed (dθ/dt) from the density of pulses constituting an angle signal (θ) from an angle sensor (21); a comparator circuit (12) to compare a feedback signal (angular speed's feedback signal) from the angular speed detection circuit (22) and a feedback signal (angle feedback signal) from the angle sensor (21) with a target signal; and a circuit which is contained in the comparator circuit (12) and outputs a drive current to any of the first through third motors (M1 through M3);

wherein the input portion (10) has an input selection switch (SW) and is configured so that a target signal supplied to the input portion (10) is forwarded to an adder circuit (11) to input a signal (unbalanced moment cancellation signal) for canceling an unbalanced moment;

wherein the second control means (external computer G) includes: an unbalanced moment compensation calculation block (23) to calculate an unbalanced moment (T1, T2, T) from a detected angle (θ); and a block (24) having a function of generating a cancellation signal for a calculated unbalanced moment (T1, T2, T) and transmitting the cancellation signal to the first control means' (console E's) adder circuit (11) and adding it to a target signal, determining that the operational bandwidth and the vibration domain are appropriately separated from each other and manufacturing an actual product based on the specification (see Step S11) (Step S15);

when too small a difference results between the maximum frequency for the operation bandwidth and the minimum frequency for the vibration domain (NO at Step S14 and a possible overlap between the bandwidth and the vibration domain), determining that there is a possibility of causing problems such as vibration generation, inability of the filter to remove vibration components, and the like, and changing a design specification so as to increase a moment of inertia of section (I) and separate the operation bandwidth and the vibration domain from each other (move the vibration domain to the right of FIG. 8) (Step S16);

when too large a difference results between the maximum frequency for the operation bandwidth and the minimum frequency for the vibration domain (NO at Step S14 and too large a distance between the bandwidth and the vibration domain), determining that the rigidity and the moment of inertia of section are large more than necessary, and changing a design specification so as to decrease the moment of inertia of section (I) and bring the operation bandwidth and the vibration domain close to each other (move the vibration domain to the left of FIG. 8) (Step S17); and repeating the above-mentioned process (claim 11).

According to this configuration, the finite element method may be used to analyze vibrations of the frame at the design stage before an actual product is manufactured. At this time, there may be found a frequency domain where the bandwidth overlaps with the vibration domain. Alternatively, a difference between the maximum frequency for the bandwidth and the minimum frequency for the vibration domain may be smaller than or equal to a specified value. In any of these cases, it is possible to assume that an elastic vibration occurs on a simulated object mounted on the actual product. Action may be taken to repeat the determination of various dimensions and the other design procedures.

BRIEF DESCRIPTION OF DRAWINGS

FIG. 11 is a flowchart showing the control according to the second embodiment in FIG. 7.

BEST MODE FOR CARRYING OUT THE INVENTION

Embodiments of the present invention will be described in further detail with reference to the accompanying drawings.

The first embodiment will be described with reference to FIGS. 1 through 5.

Figure 1:
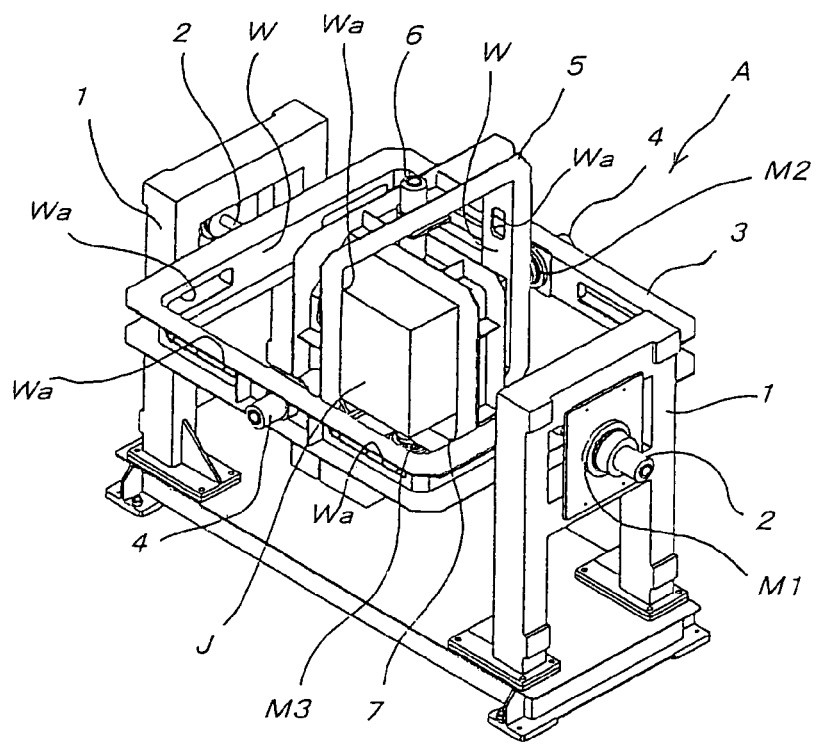
FIG. 1 is a perspective view showing the overall configuration of a first embodiment of the present invention.
Figure 2:
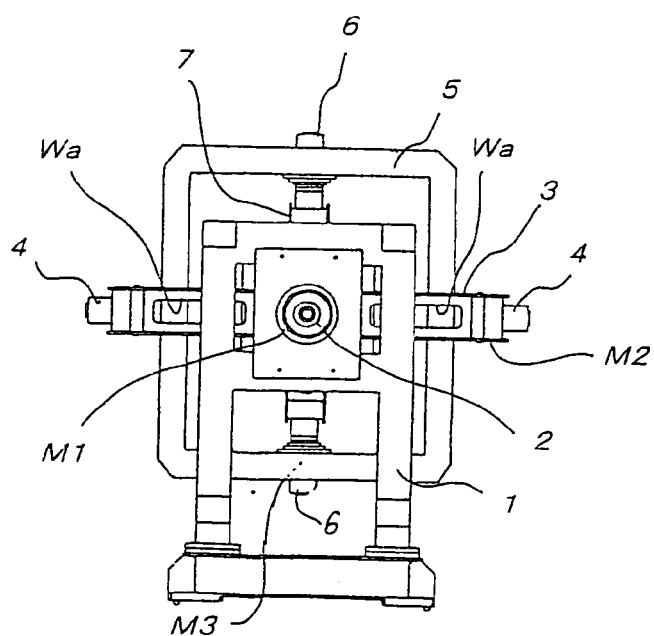
FIG. 2 is a front view showing the first embodiment of the present invention.
Figure 3:
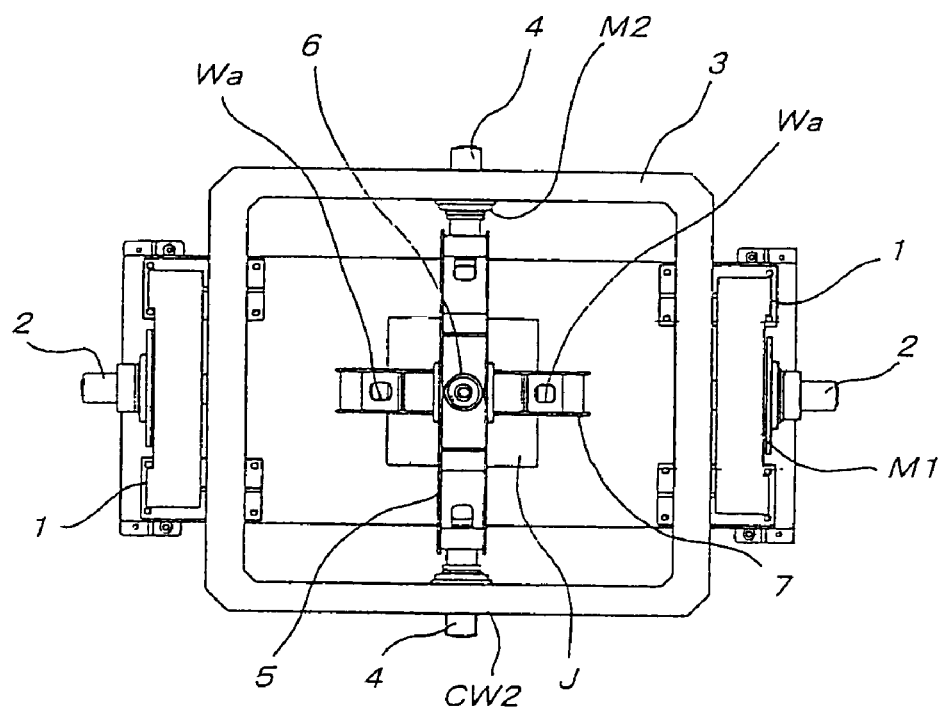
FIG. 3 is a top view showing the first embodiment of the present invention.
Figure 4:
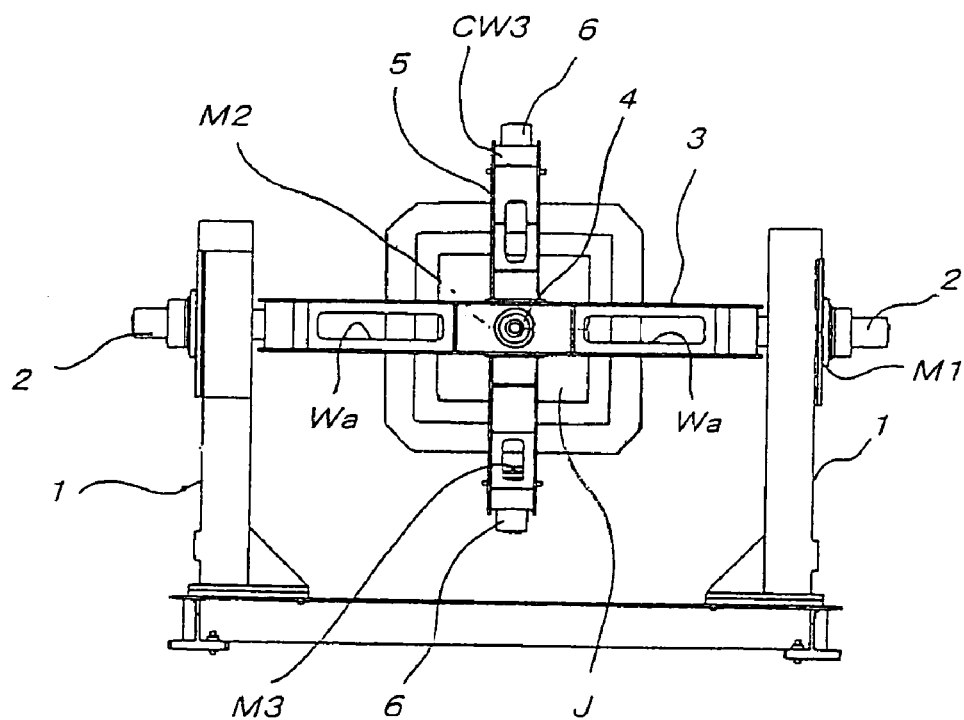
FIG. 4 is a side view showing the first embodiment of the present invention.

FIG. 1 is the perspective view of a three-axis motion table indicated by reference symbol A. FIGS. 2 through 4 are the front view, the top view, and the side view of the three-axis motion table A, respectively.

In the three-axis motion table A according to FIGS. 1 through 4, an outside frame 3 is rotatably attached around a first rotation axis 2 bridged by a pair of bridge-shaped supporting legs (1, 1) opposite to each other.

The outside frame 3 is rotatably attached with an intermediate frame 5 around a second rotation axis 4 bridged at a position opposite to the outside frame 3.

The intermediate frame 5 is rotatably attached with an inside frame 7 around a third rotation axis 6 bridged at a position opposite to the intermediate frame 5.

The inside frame 7 has a mechanism for holding a tested model J such as an artificial satellite. One of the supporting legs (1, 1) is provided with a first motor M1 to rotate the outside frame 3. The outside frame 3 is provided with a second motor M2 to rotate the intermediate frame 5. The intermediate frame 5 is provided with a third motor M3 to rotate the inside frame 7.

To ensure weight saving and rigidity, the bridge-shaped supporting leg (1, 1) is formed by welding a thin, high-tension steel plate to structure a box-shaped cross section or by welding a high-tension rectangular tube.

The outside frame 3, the intermediate frame 5, and the inside frame 7 are composed of an aluminum alloy channel material such as A5052P from the viewpoint of weight saving and easy process.

According to the first embodiment in FIGS. 1 through 4, each of the frames 3, 5, and 7 using the channel material is assembled by welding so that a web face W is positioned inside the frame. A window Wa is formed in the web face W for weight saving.

Figure 5:
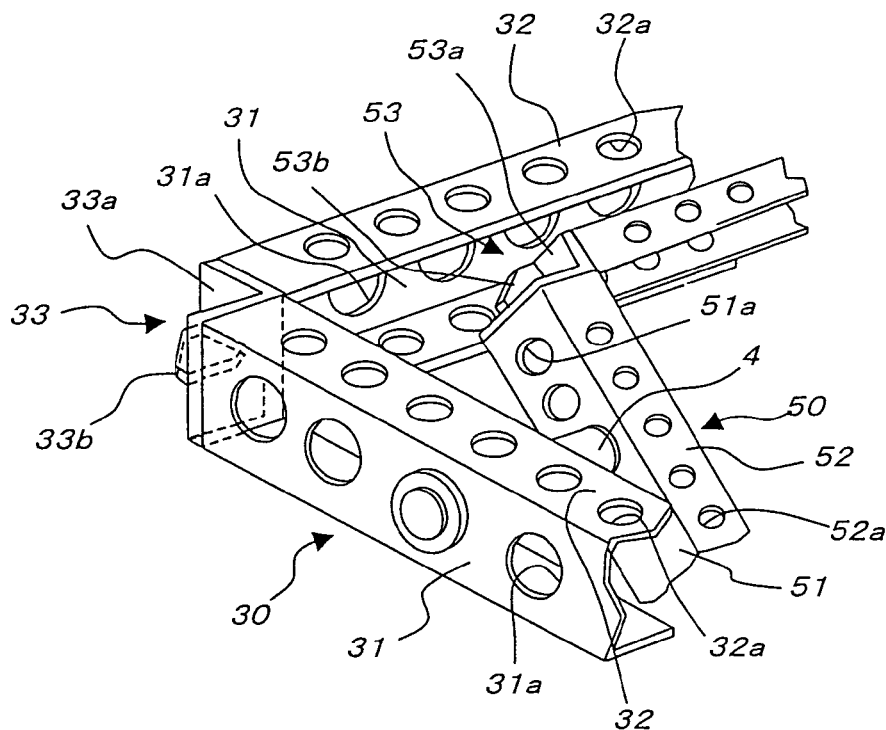
FIG. 5 is a partial perspective view showing another example of outside and intermediate frames according to the first embodiment of the present invention.

According to another example of the first embodiment in FIG. 5 (partially showing an outside frame 30 and an intermediate frame 50), the frames 30 and 50 each use a channel material and are assembled by welding via joint couplings 33 and 53 so that web faces 31 and 51 are positioned outside the frames. The corners of the joint couplings 33 and 53 are provided with equilateral corner sections 33a and 53a reinforced with strengthening ribs 33b and 53b. The web faces 31 and 51 have multiple weight saving holes 31a and 51a. Flange faces 32 and 52 have multiple weight saving holes 32a and 52a.

The third electric motor (the motor M3 for rotating the innermost frame) has a rated torque of 500 Nm and the maximum rotation speed of 70 rpm. The first electric motor (the motor M1 for rotating the outermost frame) has a rated torque of 98 Nm, the maximum torque of 715 Nm, and the maximum rotation speed of 70 rpm.

For example, the second motor M2 is used for the tested model such as a small satellite weighing 50 kg to provide operating bandwidths as high as 6.4 Hz or more corresponding to the −3 dB bandwidth and approximately 6 Hz corresponding to the −45° phase bandwidth.

As a result of the vibration mode analysis according to the finite element method, it is confirmed that a frequency domain (approximately 30 Hz) sufficiently higher than the above-mentioned operating bandwidth is attributed to the minimum frequency of frame elastic vibrations as a disturbing factor from the viewpoint of angle signals and angular speed signals detected by a satellite-mounted sensor during rotational motion testing. This exhibits definite design guidelines apparently different from the conventional undefined frame design. This is also confirmed in tested model rotation vibration (frequency response) tests by attaching a vibometer to the frame.

A pair of supporting legs (1, 1) works as a base for the entire three-axis motion table A. The weight of the three-axis motion table A is dispersed to each of the pair of both-end supporting legs. In addition, this makes it possible to suppress a bending vibration resulting from axis rotations.

As a result, the pair of supporting legs enables miniaturization and weight saving compared to bases according to the conventional technology using only a single vertical rotation axis for supporting. This accordingly enables miniaturization and weight saving of the entire three-axis motion table.

It is necessary to balance weights of the second and third electric motors M2 and M3 around the axes. For this purpose, counter weights CW2 and CW3 (see FIGS. 3 and 4) are provided at a position to gravitationally balance the second motor M2 for the outside frame 3 and at a position to balance the third motor M3 for the intermediate frame 5.

However, there is a demand for further saving the weight of the entire three-axis motion table A and decreasing inertia moments around the axes. For this purpose, it is possible to omit the counter weights CW2 and CW3 and use automatic control for weight compensation.

Figure 6:
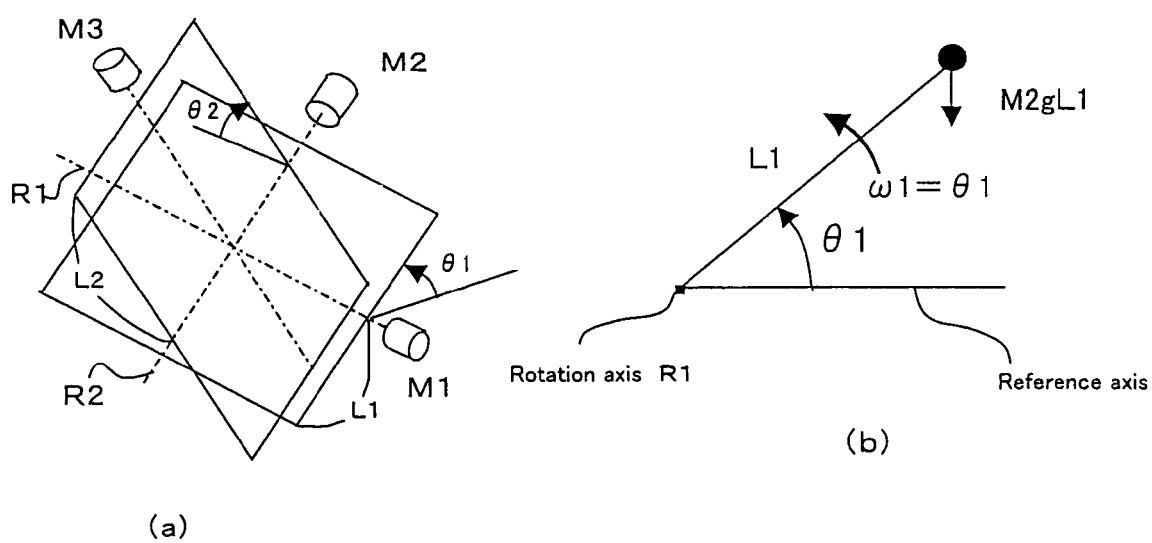
FIG. 6 is a diagram showing the principle of calculation for control according to a second embodiment of the present invention.
Figure 7:
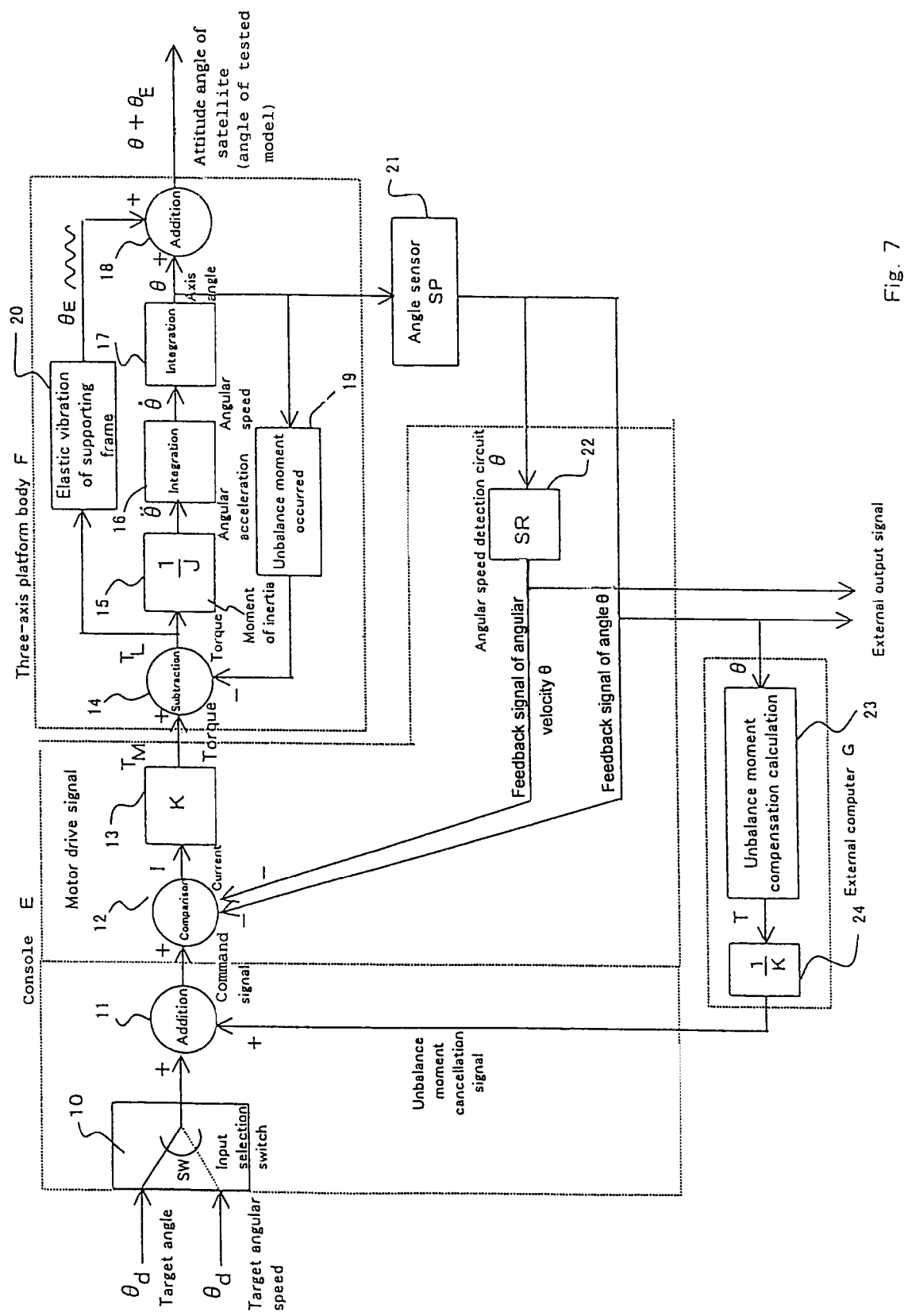
FIG. 7 is a block diagram showing the configuration of an entire controller when automatic control is provided for weight compensation in the three-axis motion table according to the second embodiment of the present invention.

The second embodiment as shown in FIGS. 6 and 7 provides such automatic control.

Except elimination of the counter weights CW2 and CW3, the second embodiment provides an external view similar to that of the first embodiment as mentioned above.

The second embodiment calculates a moment due to unbalance (resulting from weights of the electric motors M2 and M3) caused by elimination of the counter weights CW2 and CW3 at a specified control interval. To cancel effects of such moment, the embodiment provides control to add a cancellation signal to a target signal for the rotation angle or the angular speed of the electric motors M1 and M2.

With reference to FIG. 6, let us assume that M2 and M3 respectively denote masses of the electric motors (M2, M3); g denotes gravitational acceleration; L1 and L2 respectively denote distances from rotation centers of the outside frame and the intermediate frame to the corresponding electric motors; θ1 and θ2 denote rotation angles from reference axes R1 and R2; and T1 and T2 denote unbalance moments (torque needed for cancellation) Under these conditions, the following equations are valid.

$$T1 = M2 \times g \times L1 \times \cos θ1 + M3 \times g \times L2 \times \sin θ2 \times \sin θ1$$

$$T2 = M3 \times g \times L2 \times \cos θ2 \times \cos θ1$$

FIG. 6(b) shows only the unbalance moment due to M2 and omits the description of the unbalance moment due to M3. This is equivalent to the first term of the right side in equation T1.

Let us assume that J1 and J2 denote inertia moments of the outside frame and the intermediate frame provided with the electric motors (M2 and M3); and $d^2θ1/dt^2$ and $d^2θ2/dt^2$ denote rotational angle accelerations. Under these conditions, the following equations are valid.

$$d^2(θ1)/dt^2 = T1/J1$$

$$d^2(θ2)/dt^2 = T2/J2$$

It is known that selecting a motor having a large driving torque T1 (T2) or designing or manufacturing a frame having a small inertia moment J1 (J2) generates large acceleration and is advantageous to provide a high operating bandwidth.

Referring now to the block diagram in FIG. 7, the controller according to the second embodiment will be described.

FIG. 7 is the block diagram for describing frame's rotational motions around one of three axes and control over the rotational motions. Basically, the block diagram is equally applied to the three axes. The overall configuration is composed of a console E, a three-axis motion table body F, and an external computer G. The control table E includes a desired input setting portion, a motor driving electric circuit, a feedback signal reception portion (in a comparator circuit), and an angular speed detection circuit 22. The three-axis motion table body F includes an electric motor and an angle sensor.

The following chronologically describes the physical principle concerning rotational motions of the frame in the three-axis motion table denoted by reference symbol F. A three-phase motor K is supplied with current from a drive circuit in the control table E and generates a torque TM.

The generated torque TM is depleted of unbalanced moments (14) to become a torque TL. The angular acceleration $d^2θ/dt^2$ (15) to rotate the inertia moment J is equivalent to the quality obtained by dividing the torque TL by inertia moment J. The angular acceleration is integrated to yield angular speed dθ/dt (16) and is further integrated to yield rotation angle θ (17). Since the counter weights CW2 and CW3 are removed, an unbalanced moment occurs (19) and is fed back as a disturbance signal. Displacement θE due to vibrations of the frame is added to the axis' rotation angle θ, and the resultant angle becomes the satellite model's angle. It should be noted that the description in this paragraph relates to the physical principle, not to the control circuit.

The console E includes: an input portion 10 that can selectively supply an angle or an angular speed as a target signal (target angle or target angular speed); the reception portion of a comparator (part of the motor drive circuit) to receive a feedback signal (of the angular speed) from an angular speed detection portion 22; a reception portion to receive a feedback signal (angle feedback signal) from an angle sensor SP; the comparator circuit 12 to compare each target signal with each feedback signal; and an electric circuit (included in the comparator circuit 12) to generate a three-phase current based on a comparison result.

In FIG. 7, the input portion 10 has an input selection switch SW. A target signal supplied to the input portion 10 is forwarded to an adder circuit 11 that supplies a signal (unbalanced moment cancellation signal) to cancel an unbalanced moment to be described later.

FIG. 7 does not explicitly shows the above-mentioned "reception portion" as a block in the control table E. The reception portion is represented by supplying the comparator circuit 12 with the above-mentioned feedback signals (angle feedback signal and angular speed's feedback signal).

The external computer G has an unbalanced moment compensation calculation block 23 and another block 24. The unbalanced moment compensation calculation block 23 has a function of calculating unbalanced moments T1 and T2 (T) from the detected angle θ. The block 24 has a function of generating cancellation signals corresponding to the calculated unbalanced moments T1 and T2 (T) and transmitting the cancellation signal to the adder circuit 11 of the console E for addition to the target signal.

The unbalanced moment cancellation signal is supplied in such a way as to divide values of T1 and T2 expressed in the above-mentioned equations by the electric motor's amplification gain K. The block 24 performs such division operation.

The drive circuit of the control table E is composed of an angular speed detection circuit 22, a comparator circuit 12, and a circuit (included in the comparator circuit 12) to supply drive currents to any of the above-mentioned first through third electric motors M1 through M3 (not shown in FIG. 7). The angular speed detection circuit 22 finds angular speed dθ/dt from the density of pulses constituting angle signal θ. The comparator circuit 12 receives signal θ from the angle sensor 21 and compares it with target angle θd. The comparator circuit 12 also receives the angular speed signal determined by the circuit 22 as an "angular speed's feedback signal" and compares it with the target angular speed.

The signal at an addition point 18 represents an attitude angle of the tested model such as an artificial satellite. The artificial satellite is mounted with sensors to detect angular accelerations, angular speeds, angles, and the like. Since the sensor detects signals overlapped with elastic vibrations, for example, a lowpass filter needs to be used to attenuate vibration frequency components. At this time, it should be avoided to eliminate satellite's motion signals to be duly controlled. The corresponding frequency components belong to the operation frequency domain (i.e., bandwidth) for the three-axis motion table. As mentioned above, the frame is designed and manufactured so that the minimum frequency of frame's elastic vibrations is sufficiently higher than the operation frequency domain. Accordingly, vibration frequency components can be eliminated successfully.

It may be preferable to provide a second external computer instead of the lowpass filter implemented by the electric circuit. A program for the second external computer may be used to construct a digital filter. A digital signal process may be performed to attenuate vibration components.

Referring now to FIG. 7, the following describes a control method of controlling the first through third electric motors M1 through M2.

An addition point 11 is supplied with a target signal (target angle signal or target angular speed signal) for rotation angle $\theta$ or angular speed $d\theta/dt$.

The unbalanced moment T1 or T2 needs to be canceled to determine an instruction signal for rotation angle $\theta$ or angular speed $d\theta/dt$. To do this, the external computer G for calculation supplies a signal (unbalanced moment cancellation signal) equivalent to "−T1" or "−T2." The adder circuit 11 adds this signal to the target signal (target angle signal or target angular speed signal).

The comparator circuit 12 compares the command signal from the adder circuit 11 with the angle feedback signal from the angle sensor 22 or the angular speed's feedback signal from the angular speed detection circuit 22. The comparator circuit 12 calculates an electric current value so as to minimize a comparison result, i.e., so as to minimize a tracking error for the instruction signal. The electric current value is supplied to a motor circuit 13. In this manner, the feedback control is provided for the motors M1 through M3.

The flowchart in FIG. 11 also depicts the above-mentioned control.

The angle's feedback signal is unnecessary for the control over angular speed $d\theta/dt$. On the other hand, the control over angle $\theta$ mainly requires the angle's feedback signal and also uses angular speed's feedback signal to improve attenuation.

The comparator circuit 12 calculates the electric current value and supplies it to the motor circuit 13. As a result, the electric motor circuit 13 generates torque TM.

The following describes physical principles, not control circuit operations. A torque equivalent to the unbalanced moment is subtracted (14) from torque TM to yield torque TL. Torque TL is used to rotate the frame of inertia moment J and generates angular acceleration $d^2\theta 1/dt^2$ ($d^2\theta 2/dt^2$). This motion is integrated to yield angular speed $d\theta 1/dt$ ($d\theta 2/dt$) which is further integrated to yield rotation angles $\theta 1$ and $\theta 2$.

Figure 8:
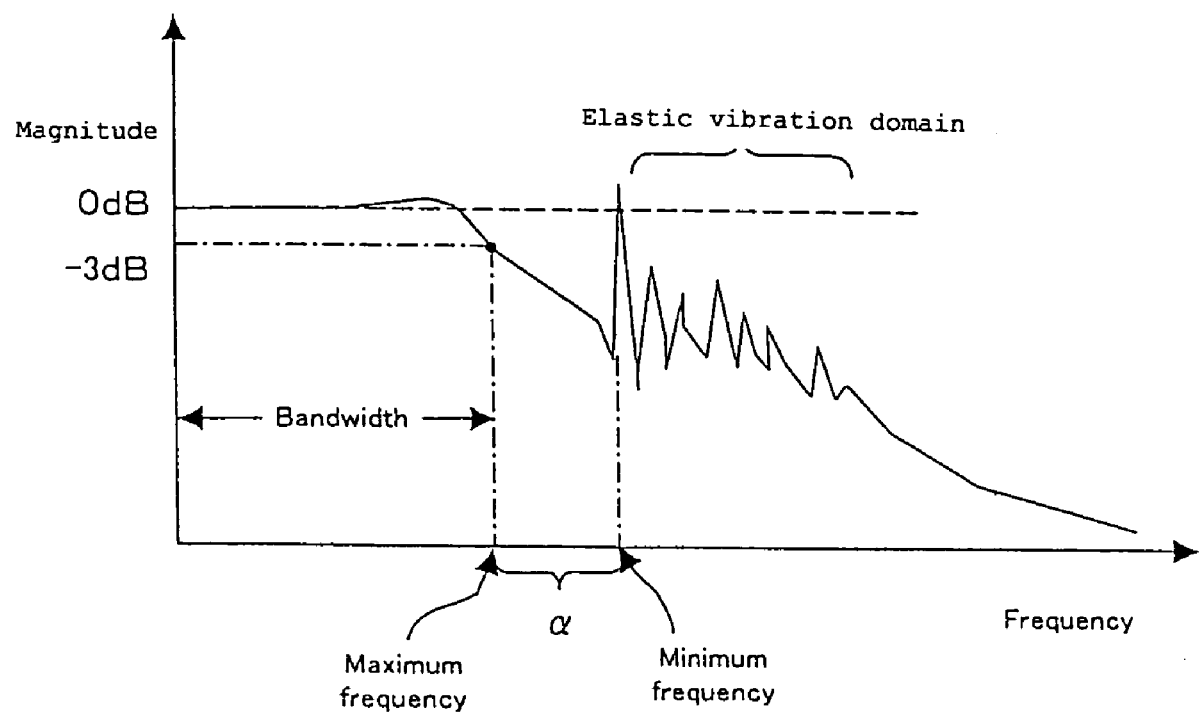
FIG. 8 is a gain plot of the Bode diagram showing vibration characteristics of the three-axis motion table.
Figure 9:
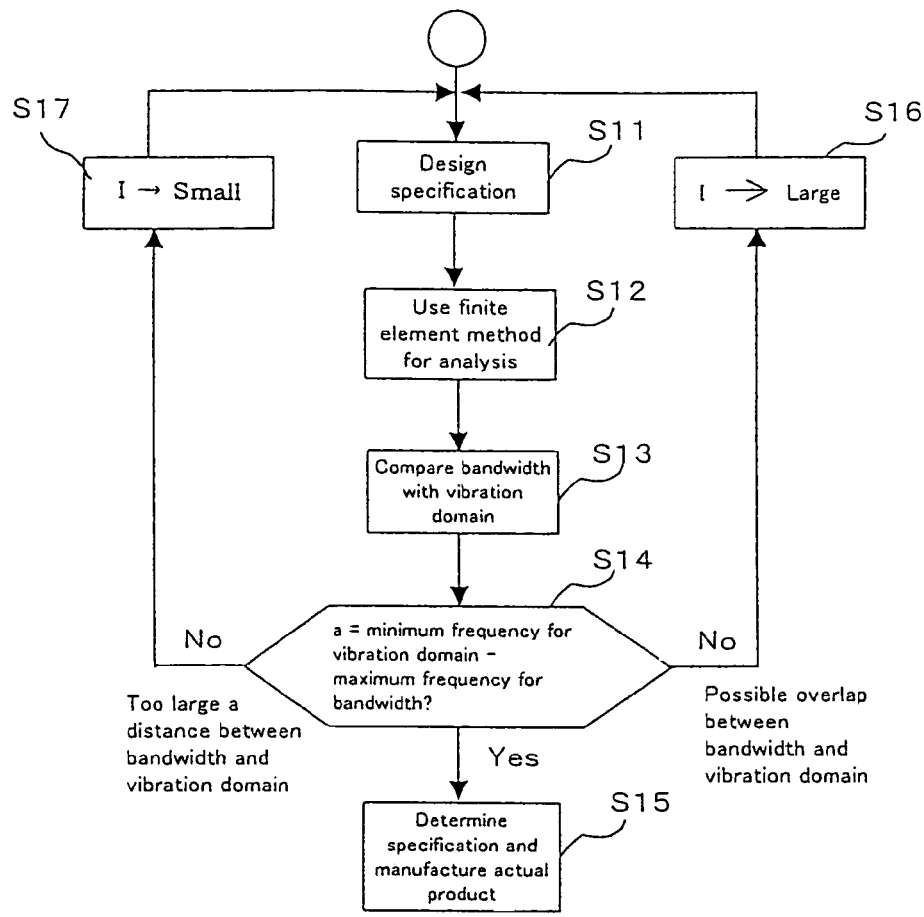
FIG. 9 is a flowchart showing an embodiment of the design method according to the present invention.
Figure 10:
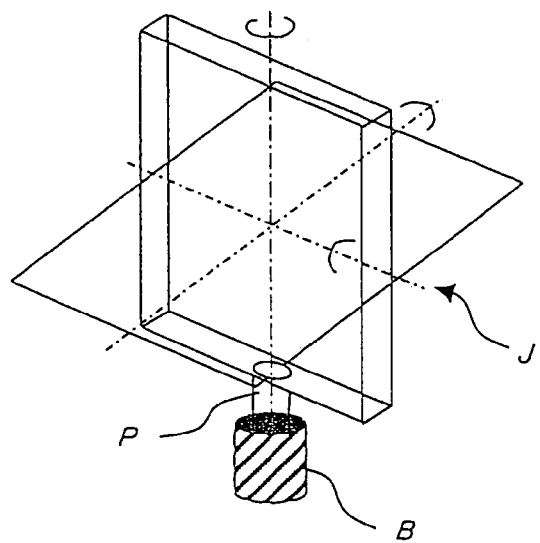
FIG. 10 is a schematic diagram showing a three-axis motion table according to the conventional technology.

Referring now to FIGS. 8 and 9, the following describes an embodiment of the design method for the three-axis motion table according to the present invention.

FIG. 8 shows frequency and vibration characteristics of the three-axis motion table. When an elastic vibration occurs on the frame in the bandwidth for a −3 dB amplitude, the attitude control apparatus does not appropriately function so as to simulate and test rotational motions. Accordingly, it is required to avoid overlap between the bandwidth and the vibration domain.

When a filter is used to remove vibration components, the cut-off frequency of a lowpass filter must be determined to attenuate high-frequency components. For example, such boundary may be set to a frequency domain between the three-axis motion table's operational bandwidth (frequency domain up to −3 dB) and the minimum frequency for the frame's vibration frequency domain.

When there is a small difference (frequency difference) between the bandwidth and the vibration frequency domain's minimum value, it is impossible to remove only vibration components using the lowpass filter and the like. Accordingly, a certain width (frequency width) is needed for the separation between the bandwidth and the frequency domain.

Increasing the frame rigidity moves a vibration frequency domain further to the right of the abscissa (frequency axis). For the three-axis motion table to at least appropriately function as an attitude control apparatus, the conventional three-axis motion table design increases the member rigidity and the moment of inertia of section as much as possible to increase a difference between the bandwidth and the vibration domain.

However, the conventional three-axis motion table design provides too large a difference between the bandwidth and the vibration domain. Consequently, the rigidity and the moment of inertia of section are designed to be large more than necessary.

By contrast, the design method for the three-axis motion table according to the present invention as shown in FIG. 9 makes it possible to keep a difference between the bandwidth and the vibration domain within an appropriate range at the design stage before the manufacture of actual products. It is possible to avoid designing the rigidity and the moment of inertia of section to be large more than necessary.

In FIG. 9, the process determines a specification about members such as materials, dimensions, provision of thinning or not, and the like (Step S11).

When the specification is determined, the process uses the finite element method to analyze modal frequencies during operation and extract the lowest frequency concerned (Step S12).

Commercial software for the finite element method may be used to analyze vibration modes.

To analyze vibration characteristics, the process compares the bandwidth with the vibration domain (see FIG. 8) (Step S13). The process determines whether or not there is appropriate difference (frequency) $\alpha$ between the maximum frequency for the bandwidth and the minimum frequency for the vibration domain (Step S14).

Appropriate difference $\alpha$ is determined depending upon circumstances according to designed basic specifications about the three-axis motion table, installation conditions, tested models, and the other conditions.

When there is found appropriate difference (frequency) $\alpha$ between the maximum frequency for the bandwidth and the minimum frequency for the vibration domain (YES at Step S14), it is determined that the bandwidth and the vibration domain are appropriately separated from each other. An actual product is manufactured based on the specification determined at Step S11 (Step S15).

There may be a case where too small a difference results between the maximum frequency for the bandwidth and the minimum frequency for the vibration domain (NO at Step S14 and a possible overlap between the bandwidth and the vibration domain). In this case, it is determined that there is a possibility of causing problems such as vibration generation, inability of the filter to remove vibration components, and the like. The process changes the design specification so as to increase the moment of inertia of section I and move the vibration domain to the right of FIG. 8 (to separate the bandwidth and the vibration domain from each other) (Step S16).

The process repeats Step S11 and later.

There may be a case where too large a difference results between the maximum frequency for the bandwidth and the minimum frequency for the vibration domain (NO at Step S14 and too large a distance between the bandwidth and the vibration domain). In this case, although no vibration occurs, it is determined that the rigidity and the moment of inertia of section are large more than necessary. The process changes the design specification so as to decrease the moment of inertia of section I and move the vibration domain to the left of FIG. 8 (to bring the bandwidth and the vibration domain close to each other) (Step S17).

The process repeats Step S11 and later.

Repeating the above-mentioned process makes it possible to determine the three-axis motion table specification so as to provide an optimum difference between the bandwidth and the vibration domain.

The illustrated embodiments are provided only as examples, not as descriptions to limit the technological scope of the present invention.

For example, each of the first through third motors can correspond to not only one motor, but also multiple motors.

INDUSTRIAL APPLICABILITY

The following describes working effects of the present invention.

(1) The pair of both-end supporting legs ensures a stable structure compared to a supporting base using only a single vertical rotation axis according to the conventional technology. In addition, the frame uses light-weight members and has many weight saving holes and the like, for example. Accordingly, the present invention enables miniaturization and weight saving.

(2) Conventionally, the motion table is driven by a hydraulic motor that has a large rotation torque and requires provision of an oil tank and piping. The present invention saves the weight of the entire three-axis motion table, enabling the use of the electric motor and making the maintenance easy.

(3) The automatic control is provided to compensate weights, making it possible to eliminate the use for counter weights.

(4) The present invention can be applied to not only aircraft and space rockets, but also automobiles, boats, and ships. Further, the present invention is applicable to simulators for training pilots of aircraft and space rockets and as facilities in amusement parks and the like for providing three-dimensional rotational motions.

(5) The present invention can prevent the member composition and the moment of inertia of section from increasing more than necessary.

The invention claimed is:

1. A three-axis motion table comprising:
an outside frame rotatably mounted around a first rotation axis by means of a pair of both-end supporting legs;
an intermediate frame rotatably mounted around a second rotation axis by means of the outside frame; and
an inside frame rotatably mounted around a third rotation axis by means of the intermediate frame,
wherein the inside frame has a test specimen holding mechanism;
wherein one of the supporting legs is provided with a first motor to rotate the outside frame;
wherein the outside frame is provided with a second motor to rotate the intermediate frame; and
wherein the intermediate frame is provided with a third motor to rotate the inside frame;
wherein the outside frame, the intermediate frame, and the inside frame are similar to each other;
wherein the inside of the intermediate frame is formed of a space large enough for the inside frame to be rotatable; and
wherein the inside of the outside frame is formed of a space large enough for the intermediate frame to be rotatable, and comprising:
a rotation angle sensor from each of three motor axes,
wherein a signal from the rotation angle sensor is electrically processed to obtain an angular speed signal; and
wherein the angular speed signal is compared with a target angle signal and a target angular speed signal to generate a control signal for minimizing a difference between the target angle and the target angular speed and controlling the first through third motors and to achieve a target rotation angle and a target rotational speed, and comprising:
first and second control means,
wherein the first control means includes: an input portion capable of selectively inputting any one of an angle and an angular speed as a target signal; an angular speed detection circuit to find an angular speed from the density of pulses constituting an angle signal from an angle sensor; a comparator circuit to compare a feedback signal from the angular speed detection circuit and a feedback signal from the angle sensor with a target signal; and a circuit which is contained in the comparator circuit and outputs a drive current to any of the first through third motors;
wherein the input portion has an input selection switch and is configured so that a target signal supplied to the input portion is forwarded to an adder circuit to input a signal for canceling an unbalanced moment;
wherein the second control means includes: an unbalanced moment compensation calculation block to calculate an unbalanced moment from a detected angle; and a block having a function of generating a cancellation signal for a calculated unbalanced moment and transmitting the cancellation signal to the first control means' adder circuit and adding it to a target signal, the latter block being configured to divide an unbalanced moment value by an electric motor's amplification gain;
wherein, when the first control means is supplied with a target signal, an unbalanced moment cancellation signal to cancel an unbalanced moment is input from the second control means and is added to a target signal in an adder circuit; and
wherein the comparator circuit compares an instruction signal from an adder circuit with an angle feedback signal from an angle sensor or with an angular speed feedback signal from an angular speed detection circuit, calculates an electric current value so as to minimize a comparison result, and outputs a drive circuit from a drive current output circuit to feedback control the first through third motors.

* * * * *